(12) United States Patent
Friesen

(10) Patent No.: US 6,718,747 B2
(45) Date of Patent: Apr. 13, 2004

(54) ROTARY CUTTER PARKING STAND

(75) Inventor: Henry Friesen, Niagara Falls (CA)

(73) Assignee: Deere & Company, Moline, IL (US)

( * ) Notice: Subject to any disclaimer, the term of this patent is extended or adjusted under 35 U.S.C. 154(b) by 6 days.

(21) Appl. No.: 09/902,527

(22) Filed: Jul. 9, 2001

(65) Prior Publication Data

US 2003/0005672 A1 Jan. 9, 2003

(51) Int. Cl.[7] .............................. A01D 34/82; B60S 9/02
(52) U.S. Cl. .................. 56/218; 56/DIG. 14; 280/475; 254/420
(58) Field of Search .................. 56/218, 228, 255, 56/295, DIG. 14; 172/677; 254/419, 420, 424, 93 H; D34/31; 280/475, 763.1

(56) References Cited

U.S. PATENT DOCUMENTS

| | | | | |
|---|---|---|---|---|
| 2,816,410 A | * | 12/1957 | Nobles | 172/59 |
| 3,791,676 A | * | 2/1974 | Spratlen | 280/475 |
| 4,469,348 A | * | 9/1984 | Crook | 280/475 |
| 4,619,463 A | * | 10/1986 | Weaver | 280/475 |
| 5,011,119 A | * | 4/1991 | Harrington | 254/420 |
| 5,067,692 A | * | 11/1991 | Nudd et al. | 254/420 |
| 5,087,063 A | * | 2/1992 | Merrill, Jr. | 280/475 |
| 5,156,216 A | * | 10/1992 | Van Mill | 172/138 |
| 5,386,680 A | * | 2/1995 | Friesen | 56/DIG. 14 |
| 5,706,901 A | * | 1/1998 | Walters et al. | 172/439 |
| 6,176,470 B1 | * | 1/2001 | Breslin et al. | 254/419 |
| 6,336,281 B2 | * | 1/2002 | Fulton, III | 172/677 |
| 6,430,908 B1 | * | 8/2002 | Friesen | 172/677 |

OTHER PUBLICATIONS

Servis Advertising Brochure relating to the Gyro 1310 Rotary Cutter and Shredder, dated Mar. 1975, front of single page flyer.
Land Pride Brochure relating to 15' Rotary Cutter, dated Jul., 1996, cover and inside of back page.

* cited by examiner

Primary Examiner—Thomas B. Will
Assistant Examiner—Nathan Mammen

(57) ABSTRACT

A towed rotary cutter includes a self-leveling hitch equipped with a parking stand mounted in a centered position beneath the hitch. Through the operation of the leveling links, the hydraulic lift cylinder that is used for raising and lowering the ground wheels of the cutter relative to the cutter frame is also used to manipulate the hitch, once the parking stand is placed in its park position, so as to remove the weight of the hitch from the tractor drawbar when unhitching the tractor from the rotary cutter, or to place the hitch clevis at the correct height for connecting it to the tractor drawbar when hitching the cutter to the tractor. In a first embodiment, the parking stand is constructed for use with a hitch having a feature for automatically maintaining the clevis in a horizontal attitude. In a second embodiment, the parking stand includes a clevis support which is oriented for supporting the clevis in a horizontal attitude when the parking stand is in its park position, but is moved so as to permit free pivotal movement of the clevis when the parking stand is in its stored position.

4 Claims, 6 Drawing Sheets

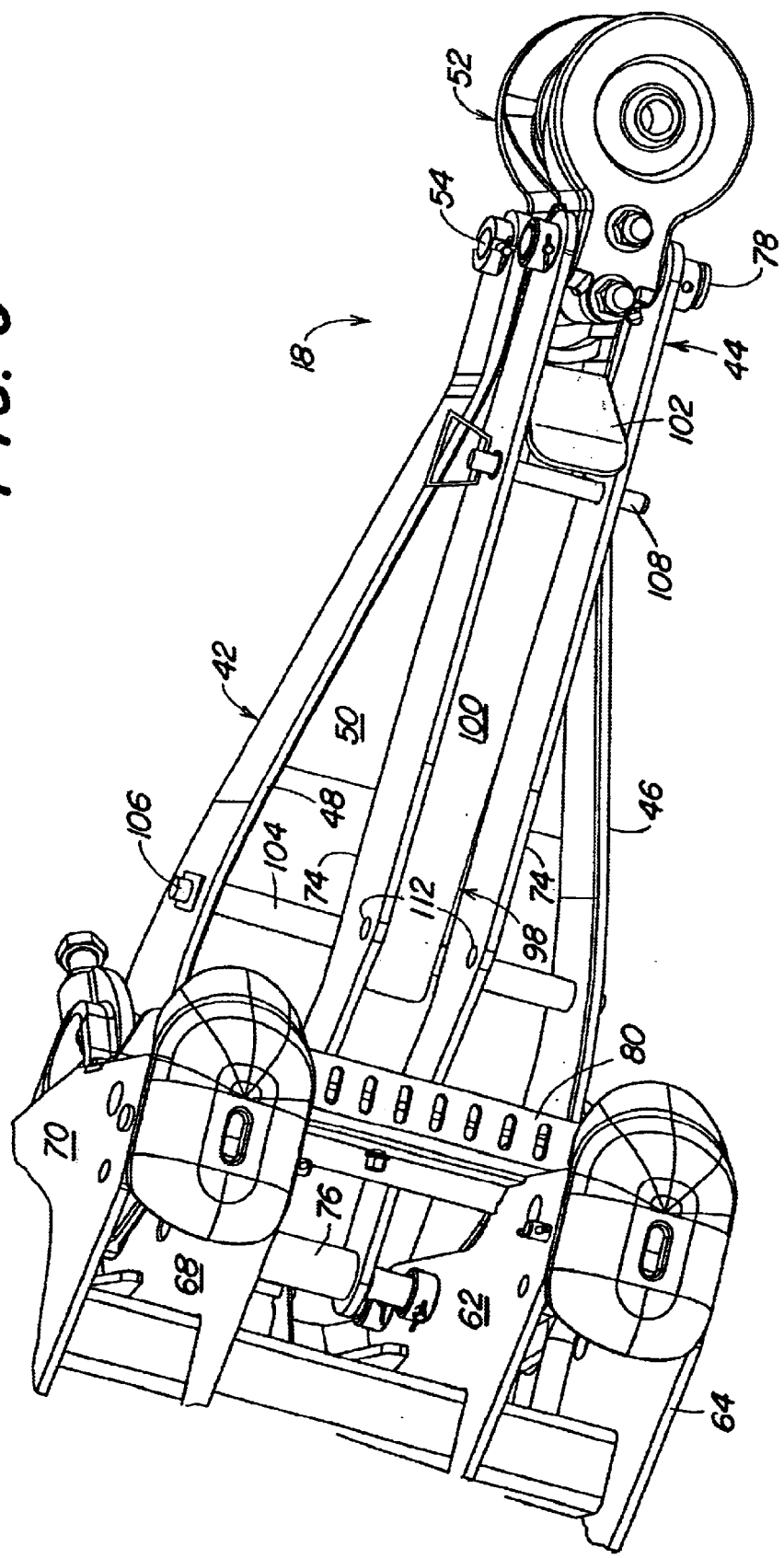

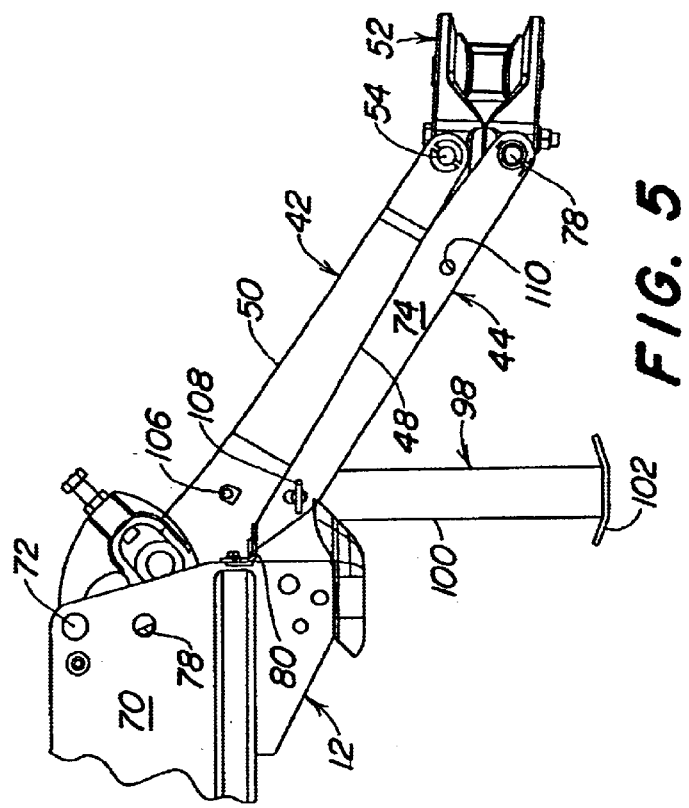
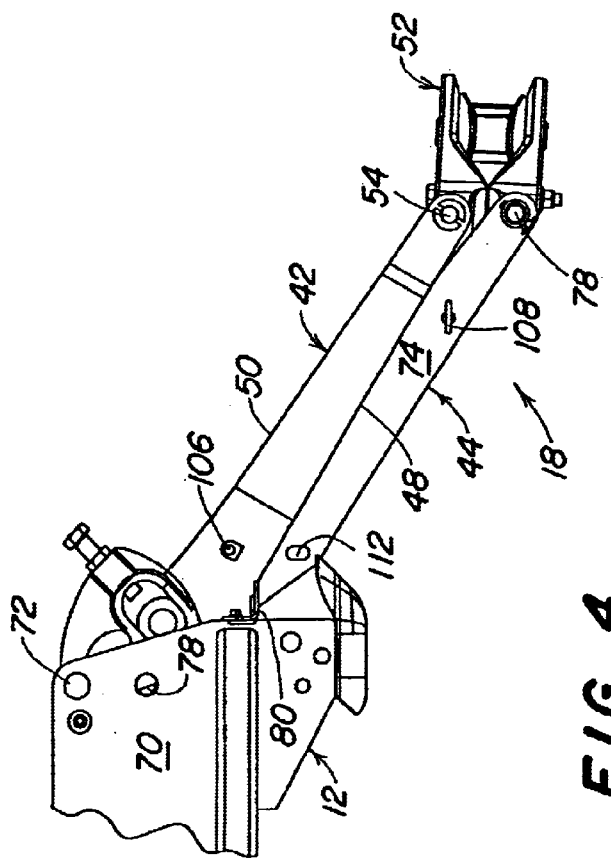

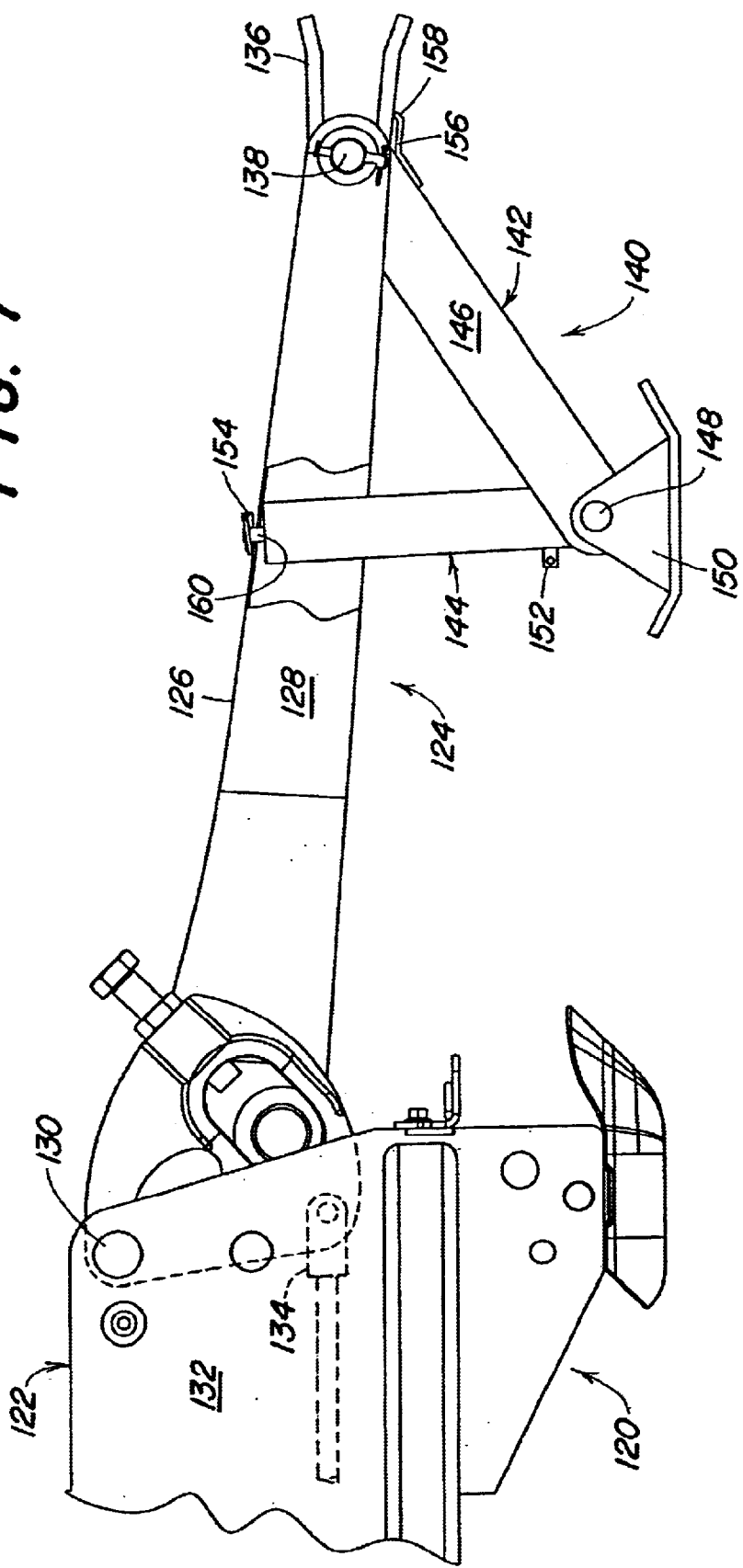

ROTARY CUTTER PARKING STAND

FIELD OF THE INVENTION

The present invention relates to a rotary cutter and more specifically relates to a parking stand for a pull-type rotary cutter.

BACKGROUND OF THE INVENTION

Pull-type rotary cutters require some means of raising and lowering the hitch to attach it to, or disconnect it from, the drawbar of a towing tractor and for supporting the cutter in storage. Currently, known rotary cutters are provided with crank jacks that are mounted on the side and near the front of the hitch. After attaching the tractor, the jack must be removed from the hitch and stored on the deck to prevent tire, driveshaft or ground interference. A storage bracket is provided for this, however, jacks stored on the deck tend to cause paint damage from hitting the deck during rough field work.

On heavy, flex wing cutters, it becomes difficult to crank the jack. Further, because the jack is located off to one side, it tends to lean and cause the cutter to shift to one side as the hitch is raised, putting pressure on, and making it difficult to remove, the drawbar pin. Some jacks, when used with hitches not having a self-leveling feature, tend to lean fore-and-aft depending on the angle of the hitch, this leaning likewise putting pressure on the drawbar pin. A further drawback of these crank jack arrangements is that they tend to get lost, because they are removable and sometimes are not put back in the storage position.

SUMMARY OF THE INVENTION

According to the present invention, there is provided an improved arrangement for supporting the hitch of a rotary cutter.

An object of the invention is to provide a parking stand arrangement, for a towed rotary cutter, which does not require a screw jack.

Another object of the invention is to provide a parking stand arrangement which is mounted for being swung between a lowered park position and a raised stored position beneath the hitch of the rotary cutter.

A more specific object of the invention is to provide a parking stand arrangement, like that of the immediately preceding object, which, in accordance with a second embodiment, acts to hold the hitch clevis in a horizontal attitude when the parking arrangement is in its park position.

A further object of the invention is to provide a parking stand arrangement, for a towed rotary cutter, which, in accordance with a first embodiment, utilizes the hydraulic actuator used for raising and lowering the cutter to also adjust the hitch such that the deployed parking stand acts to raise the hitch so as to relieve any stress on the drawbar or hitch pin which can then be removed.

Yet another object of the invention is to provide a parking stand arrangement, as set forth in the objects appearing above, wherein the parking stand is located at a central location beneath the hitch so that the hitch is lifted straight up with no binding forces being generated at the hitch pin.

These and other objects of the invention will become apparent from a reading of the ensuing description together with the appended drawings.

BRIEF DESCRIPTION OF THE DRAWINGS

FIG. 3 is a perspective underside view of the cutter hitch showing the parking stand in its stored position.

FIG. 4 is a right side elevational view of the cutter hitch shown in FIG. 2, with the parking stand shown in its raised stored position.

FIG. 5 is a view like FIG. 4, but showing the parking stand in its lowered park position.

FIG. 7 is a view like FIG. 6 but showing the parking stand in its lowered parking position wherein it supports the clevis in a horizontal attitude.

DESCRIPTION OF THE PREFERRED EMBODIMENT

Figure 1:
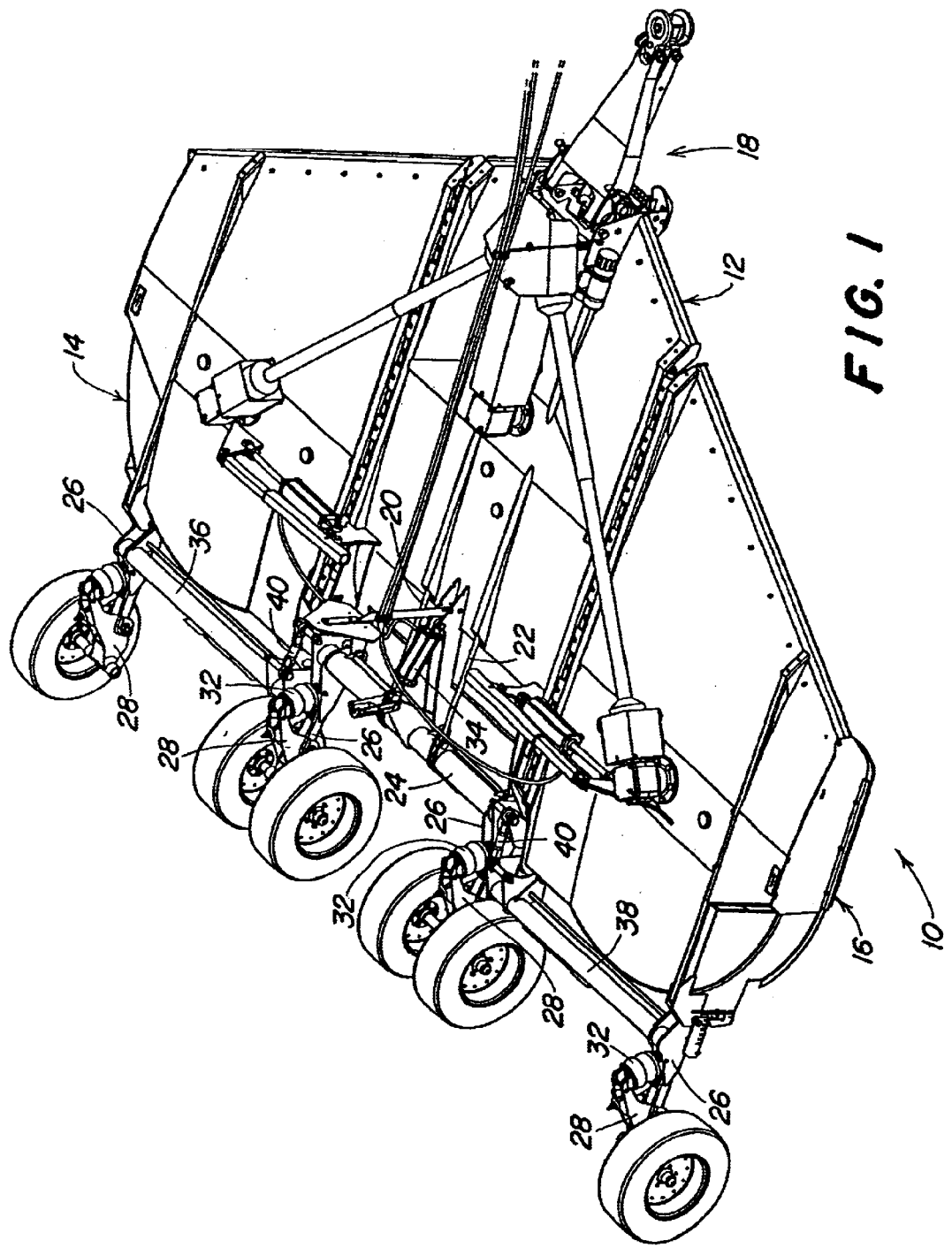
FIG. 1 is a right front perspective view of a towed rotary cutter with which the present invention is particularly adapted for use.
Figure 2:
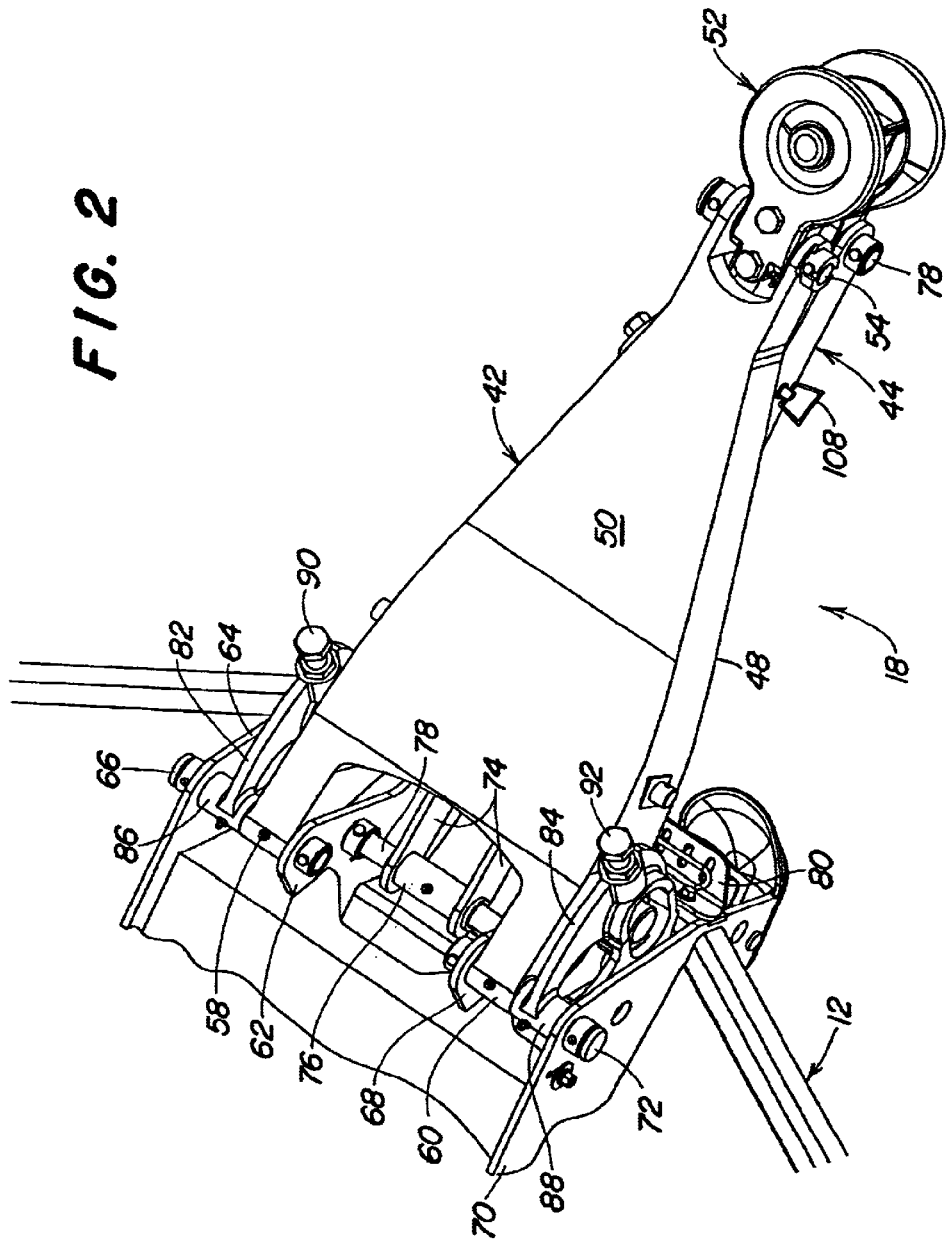
FIG. 2 is a right top perspective view of the hitch of the rotary cutter shown in FIG. 1.

Referring now to FIG. 1, there is shown a towed, flex wing rotary cutter 10 including a center frame 12 and left and right wing frames 14 and 16, respectively. Mounted at the front end of the center frame 12 is a self-leveling hitch 18, coupled in a manner not shown, with respective front ends of fore-and-aft extending, left and right leveling rods 20 and 22. Rear ends of the leveling rods 20 and 22 are respectively coupled to a pair of transversely spaced lugs projecting from a tubular, transverse center axle 24 that is mounted to a rear location of the middle frame 12 for rotation about a transverse axis. Fixed to opposite end locations of the axle 24 are identical, rearwardly projecting struts 26, to the rear ends of each of which a rocker arm 28 is mounted for pivoting vertically about a second transverse axis. A transverse spindle is fixed to the rear end of each of the rocker arms 28 and has a pair of tandem ground wheels 30 rotatably mounted on its opposite ends. An air spring 32 is mounted between each strut 26 and a forward end of the associated rocker arm 28. A lift cylinder 34 is coupled between the center frame 12 and the center axle 24 for rocking the latter for adjusting the wheels 30 vertically relative to the frame 12, the rocking movement of the axle 24 being transferred to the hitch 18 by the leveling rods 20 and 22. Respectively provided on the wing frames 14 and 16 for adjustment simultaneously with the middle axle 24 are left and right wing axles 36 and 38, respectively, which each have a strut 26 at its outer end together with a rocker arm 28 and air spring 32. Rocking movement of the middle axle 24 is transferred to each of the axles 36 and 38 by links 40 in the form of turnbuckles coupled between respective brackets provided at the outer ends of the middle axle 24 and inner ends of the axles 36 and 38.

Referring now also to FIGS. 2–5, it can be seen that the hitch 18 includes upper and lower arms 42 and 44, respectively. The upper arm member 42 has a major portion generally in the form of a downwardly opening channel having opposite legs or flanges 46 and 48 depending from a web 50 which tapers or becomes narrower from rear to front. The opposite flanges 46 and 48 extend forwardly beyond the web 50 in parallel relationship to each other and define a coupling yoke having an upper rear end portion of a clevis 52 received between, and pivotally coupled to, them by a horizontal, transverse pivot pin 54. The rear end of the web 50 of the upper arm member 42 is provided with a centrally located, rearwardly opening, U-shaped notch, with a U-shaped flange depending from the web at the notch so that left and right coupling portions are formed, with rear ends of the latter being respectively provided with cylindrical, axially aligned mounting tubes 58 and 60. The left tube 58 is located between an upper location of a first set of inner and outer vertical flanges 62 and 64 provided on the front of the middle deck frame 12, and a transverse pin 66 extends through aligned holes and collars respectively provided in and on the flanges 62 and 64 and through the left mounting tube 58. Similarly, a right set of inner and outer vertical flanges 68 and 70 are provided on the front of the middle deck frame 12, and a right mounting pin 72 extends through aligned holes and collars respectively provided in and on the flanges 68 and 70 and through the right mounting tube 60.

The lower arm 44 of the hitch 18 is defined by a pair of vertical, fore-and-aft extending, parallel straps 74 having their rear ends angled upwardly from major straight portions of the straps and joined together by a cylindrical mounting tube 76. The mounting tube 76 is located between lower locations of the inner vertical flanges 62 and 68 approximately vertically below the axis of the mounting tubes 58 and 60 of the upper arm 42 and a mounting pin 78 extends through aligned holes and collars, respectively provided in and on the flanges 62 and 68, and through the mounting tube 76. Forward ends of the straps 74 straddle a lower rear location of the clevis 52 and are pivotally attached thereto by a transverse pin 78. Thus, the arms 42 and 44 are arranged as a parallel linkage between the deck frame 12 and the clevis 52 so that the latter remains disposed horizontally for having a drawbar of a towing tractor coupled thereto. An angle member 80, which forms part of a chain shield (chains not shown) is mounted to the frame 12 beneath the hitch 18, with its legs extending vertically and horizontally, and is used to check the clearance to the lower hitch link formed by the straps 74.

Provided for transferring fore-and-aft shifting motion of the leveling rods 20 and 22 to the hitch 42 are left and right crank arms 82 and 84, which are generally triangular is side view and have respective cylindrical couplers 86 and 88 received on the hitch mounting pins 66 and 72 at respective locations between the outer plates 64 and 70 and the upper hitch arm 42. Respective upper forward corners of the crank arms 82 and 84 are provided with threaded tubes receiving screws 90 and 92 which are held in selected adjusted positions where their lower ends bear against respective, transverse cylindrical stops fixed to the flanges 46 and 48 of the upper hitch arm 42 and received in over-sized cylindrical openings provided in the crank arms 82 and 84, with only the cylindrical stop 94 fixed to the right flange 48 and the oversized opening 96 of the right crank arm 84 being visible. Lower rear corners (not shown) of the crank arms 82 and 84 are respectively pinned to devises formed at the front ends of the leveling rods 20 and 22.

Referring to FIG. 3, it can be seen that a parking stand 98 is mounted to the hitch 18. Specifically, as considered in its raised stored position, as shown, the parking stand 98 includes a straight, tubular parking stand member 100, of square cross section, and a plate welded to a forward end of the member 100 so as to define a foot 102. A rear end of the member 100 is located centrally between the flanges 46 and 48, of the hitch upper arm 42, and is joined to a tubular spacer 104 that extends to the flanges 46 and 48. A horizontal, transverse pivot pin 106 extends through the flanges 46 and 48 and through the spacer 104 so as to define a horizontal transverse axis about which the parking stand 98 may pivot. A latch or retaining pin 108 is releasably received in axially aligned holes 110 (FIG. 5) provided in the straps 74 of the hitch lower arm 44 and bears against a bottom surface of the tubular member 100 at a location adjacent the foot 102 so as to keep the parking stand 98 in its raised, stored position.

When the retaining pin 108 is removed from the holes 110, the parking stand 98 may be swung downwardly to a near vertical position wherein a hole, not visible, provided in the tubular member 100 becomes aligned with vertically elongated, transversely aligned holes 112 provided in the hitch lower arm straps 74. The latch pin 108 is inserted through the aligned holes 112 and the hole in the stand tubular member 100 so as to retain the parking stand 98 in its lowered, park position shown in FIG. 5.

The operation of the embodiment parking stand embodiment shown in FIGS. 1–5 is as follows.

Assuming that the rotary cutter 10 is being towed by a tractor, the hitch clevis 52 will be pinned to the rear end of the tractor drawbar and the parking stand 98 will be in its raised stored position beneath the web 50 of the hitch upper arm 42. There it will rest on the latch pin 108 which holds the parking stand 98 in place.

If it is then desired to park the rotary cutter 10, the tractor will be driven to the desired location and the lift cylinder 34 will be extended to raise the cutter 10 to its full height. The latch pin 108 would then be removed from its location in the front set of holes 110, in the hitch lower arm straps 74, and the parking stand 98 lowered to its park position and retained therein by inserting the latch pin 108 through the rear set of holes 112, in the lower arm straps 74, and the hole provided in the stand tubular member 100. The lift cylinder 34 is then lowered until the foot 102 of the parking stand 98 engages the ground and the clevis 52 just starts to be lifted off the drawbar. Because the hitch 18 is self-leveling and the parking stand 98 is centered beneath the hitch 18, the lifting action of parking stand 98 is substantially vertical resulting in non-binding movement relative to the drawbar pin. The drawbar pin is then pulled, the tractor moved forward to clear the clevis 52 and the lift cylinder then actuated to either lower the cutter 10 to its transport position wherein a cylinder lock is placed in a lock position about the cylinder rod to prevent its further collapse, or to a lowered position wherein pads at the front, underside of the frame section 12 rest on the ground. Next, the tractor is shut off and the hydraulic hoses disconnected.

To once again attach the rotary cutter to the towing tractor, the tractor is backed to align its drawbar with the clevis 52, with the tractor being stopped so that the drawbar is just forward of the clevis 52. The tractor is shut off and the hydraulic hoses are once again attached to the tractor. The tractor is started and the cylinder 34 is actuated to raise the rotary cutter 10 until the clevis 52 and the tractor drawbar are at the same height. The tractor is backed up until the drawbar enters the clevis 52 and the holes in the drawbar and clevis become aligned. The drawbar pin is then installed, the cylinder 34 actuated to raise the cutter 10 to its full height, the parking stand latch pin 108 removed and the parking stand 98 rotated to its stored position wherein the pin 108 is once again installed so that the parking stand is retained centered under the hitch 18.

Figure 6:
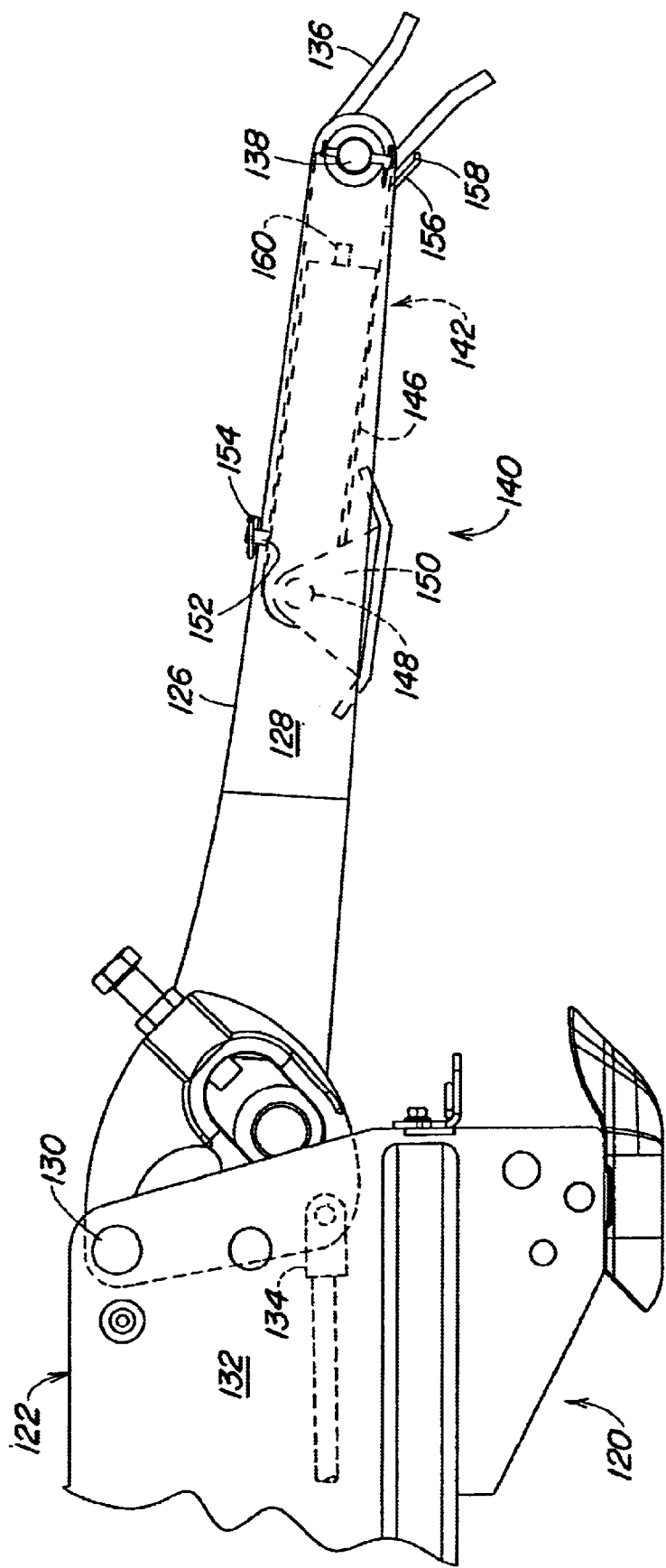
FIG. 6 is a right side elevational view of cutter hitch which is not self-leveling with a second embodiment of the parking stand being shown in its raised stored position wherein it permits the hitch clevis to pivot freely about its horizontal pivot connection.

Referring now to FIGS. 6 and 7, there is shown a second embodiment of the invention wherein the parking stand is associated with a rotary cutter hitch that does not have a self-leveling clevis. Specifically, there is shown a rotary cutter frame 120 having a vertical bracket assembly 122 at its forward end. A hitch 124, which is preferably configured somewhat like the upper hitch arm 42 of the previously described hitch 18, includes a web 126 and opposite depending flanges 128. Upper rear end portions of the hitch 18 are located between, and coupled by one or more pins 130 to vertical, transversely spaced plates, including a rightmost plate 132, defined by the bracket assembly 122. A pair of leveling rods 134 (only one shown) are coupled to lower rear locations of respective side-to-side leveling links of the hitch 124 for keeping it level as the wheels of the cutter are raised and lowered by the cutter hydraulic lift cylinder. The hitch 124 has a U-shaped clevis 136 at its forward end which is mounted for pivoting about a transverse pin 138.

A parking stand arrangement 140 is mounted at a central location beneath the web 126 of the hitch 124. Specifically, the parking stand arrangement 140 is constructed in the form of a scissors link including first and second arms 142 and 144, respectively, with the first arm 142 being defined by a pair of parallel straps 146 having respective first ends received between forwardly projecting ends of the flanges 128 of the hitch 124 at opposite sides of the clevis 136 and pivotally mounted to the flanges 128 by the pin 138 which pivotally mounts the clevis 136. The other ends of the parallel straps 146 are located on the opposite sides of one end of the second arm 144 and pivotally connected thereto by a pin 148, this pin also passing through spaced parallel lugs of a shoe 150. As shown in FIG. 6, the parking stand arrangement 140 is in a raised, stored position wherein the second arm 144 is folded between the straps 146 of the first arm 142, with a cylindrical pin 152, that is welded to an upwardly facing surface of the arm 144 adjacent the end carrying the shoe, being received in a hole provided in the hitch web 126 and secured there by a fastener 154 inserted in a cross bore provided in the pin 152. A clevis support 156, in the form of a shaped plate, is welded across the bottoms of the straps 146 of the parking stand arrangement first arm in the vicinity of the clevis 136, with an engagement portion 158 of the support 156 being in a downward rotated position relative to the clevis 136 so as to allow it to pivot freely when the parking stand arrangement 140 is in its stored position.

Referring to FIG. 7, there the parking stand arrangement is shown in is park position wherein the first arm 142 is rotated down from its stored position, and the second arm 144 is substantially vertical with a second cylindrical pin 160, that is fixed so as to define an extension of the second arm 144 in a direction opposite from the shoe 150, the pin 160 being received in the hole in the hitch web 126 that was previously occupied by the pin 152, with the fastener 154 being inserted in a cross hole in the pin 160 so as to hold this end of the second arm 144 in place. It is noted that when the parking stand arrangement 124 is in its park position, an end of the engagement portion 158 of the clevis support 156 engages the clevis 136 and supports it in a horizontal attitude conducive to having the tractor drawbar backed to it for hooking the rotary cutter to the tractor.

Other than for the part played by the clevis support 156, the operation of the parking stand arrangement 140 is quite similar to that for the parking stand 98 and further description of the operation is omitted for the sake of brevity.

Having described the preferred embodiment, it will become apparent that various modifications can be made without departing from the scope of the invention as defined in the accompanying claims.

What is claimed is:

1. In combination with a towed rotary cutter having a frame supported at its rear on at least one ground wheel mounted to an axle for being selectively swung vertically, through operation of an extensible and retractable hydraulic cylinder, so as to adjust the cutter frame to selected heights between, and including, fully raised and lowered positions, a leveling arrangement extending between the axle and a hitch mounted on the front of the cutter frame for maintaining the hitch in a level attitude as the wheel is swung vertically, a parking stand arrangement comprising: only one parking stand member having a first end pivotally mounted to said hitch at a first location about which said parking stand member is pivotable between a fore-and-aft extending, raised stored position beneath an uppermost structure of said hitch and a vertically extending park position; and a retaining arrangement including a first hole arrangement in said hitch approximately vertically below said first location; a second hole arrangement in said hitch spaced forward of said first hole arrangement at a height which is just below said parking stand member when the latter is in said stored position; and a retaining pin being selectively received in said first and second hole arrangements for selectively securing said parking stand member in its stored and park positions.

2. In combination with a towed rotary cutter having a frame supported at its rear on at least one ground wheel mounted to an axle for being selectively swung vertically, through operation of an extensible and retractable hydraulic cylinder, so as to adjust the cutter frame to selected heights between, and including, fully raised and lowered positions, a leveling arrangement extending between the axle and a hitch mounted on the front of the cutter frame for maintaining the hitch in a level attitude as the wheel is swung vertically, and said hitch including a clevis at its forward end coupled for pivoting vertically about a horizontal clevis mounting pin, a parking stand arrangement comprising: first and second parking stand members; said second parking stand member having a first end coupled to said hitch by said clevis mounting pin and having a second end pivotally attached to one end of said first parking stand member; a coupling arrangement associated with said first parking stand member and said hitch for selectively securing said first parking stand member to said hitch in a park position, wherein said first parking stand member is substantially vertical, and a stored position, wherein said first parking stand member is folded to extend alongside said second parking stand member and has a location adjacent said one end of said first parking stand member.

3. The combination defined in claim 2 wherein said second parking stand member includes a clevis support located adjacent said first end in a location wherein it is disposed for permitting free pivotal movement of the clevis when said parking arrangement is in said stored position and for engaging said clevis and holding it in a horizontal attitude conducive for being coupled to a tractor drawbar when said parking arrangement is in said park position.

4. The combination defined in claim 3 wherein said first parking stand member has a first pin, adjacent that end which is pivotally coupled to said second parking stand member, and a second pin defining a second end of said first parking stand member; and said hitch including a transverse plate containing a hole which receives said first pin when said parking stand arrangement is in said stored position and which receives said second pin when said parking stand arrangement is in said park position.

* * * * *